United States Patent [19]

Hewitt

[11] Patent Number: 5,006,138

[45] Date of Patent: Apr. 9, 1991

[54] VAPOR RECOVERY SYSTEM

[76] Inventor: J. Paul Hewitt, P.O. Box 1091, Angleton, Tex. 77515

[21] Appl. No.: 521,028

[22] Filed: May 9, 1990

[51] Int. Cl.⁵ .............................................. F25J 3/00
[52] U.S. Cl. ........................................ 62/18; 62/48.2; 62/93
[58] Field of Search ................. 62/11, 87, 93, 18, 48.2

[56] References Cited

U.S. PATENT DOCUMENTS

| | | | |
|---|---|---|---|
| 2,494,120 | 1/1950 | Ferro, Jr. | 62/87 |
| 2,765,877 | 10/1956 | Hartman et al. | 183/115 |
| 2,849,150 | 8/1958 | Tompkins | 220/85 |
| 3,266,262 | 1/1965 | Moragne | 62/54 |
| 3,648,436 | 3/1972 | Schonewald et al. | 55/88 |
| 3,714,790 | 2/1973 | Battey | 62/54 |
| 3,739,551 | 6/1973 | Eckert | 55/90 |
| 3,932,159 | 1/1976 | Goldsberry | 62/87 |
| 3,981,156 | 9/1976 | Modisette et al. | 62/54 |
| 3,992,891 | 11/1976 | Pocrnja | 62/88 |
| 4,027,495 | 6/1977 | Edwards | 62/54 |
| 4,068,710 | 1/1978 | Edwards | 165/111 |
| 4,077,789 | 3/1978 | Edwards | 62/54 |
| 4,283,212 | 8/1981 | Graham et al. | 62/18 |
| 4,490,985 | 1/1985 | Wells | 62/86 |
| 4,717,406 | 1/1988 | Gliacobbe | 62/18 |

OTHER PUBLICATIONS

Klatz et al., *Handbook of Natural Gas Engineering*, 1959, pp. 512-513.

Burklin et al., *Background Information on Hydrocarbon Emissions From Marine Terminal Operation-Vol I: Discussion*, pp. 139-146, Nov. 1976.

*Primary Examiner*—Ronald C. Capossela
*Attorney, Agent, or Firm*—Kenneth H. Johnson

[57] ABSTRACT

A vapor recovery system is disclosed wherein the condensable organic compounds e.g., hydrocarbons or chemicals contained in hydrated air mixture are removed by first dehydrating the vapors by refrigeration then desiccation followed by indirect heat exchange with a refrigerant gas at cryogenic temperatures in a chiller. The clean vapors from the system may be used to pre-cool the air mixture prior to contact in the chiller. Additionally, the clean, dry vapors may be used to regenerate the desiccant within the dehydrator. The rehydrated clean vapors may be dehydrated by returning them to the feed to the system.

13 Claims, 2 Drawing Sheets

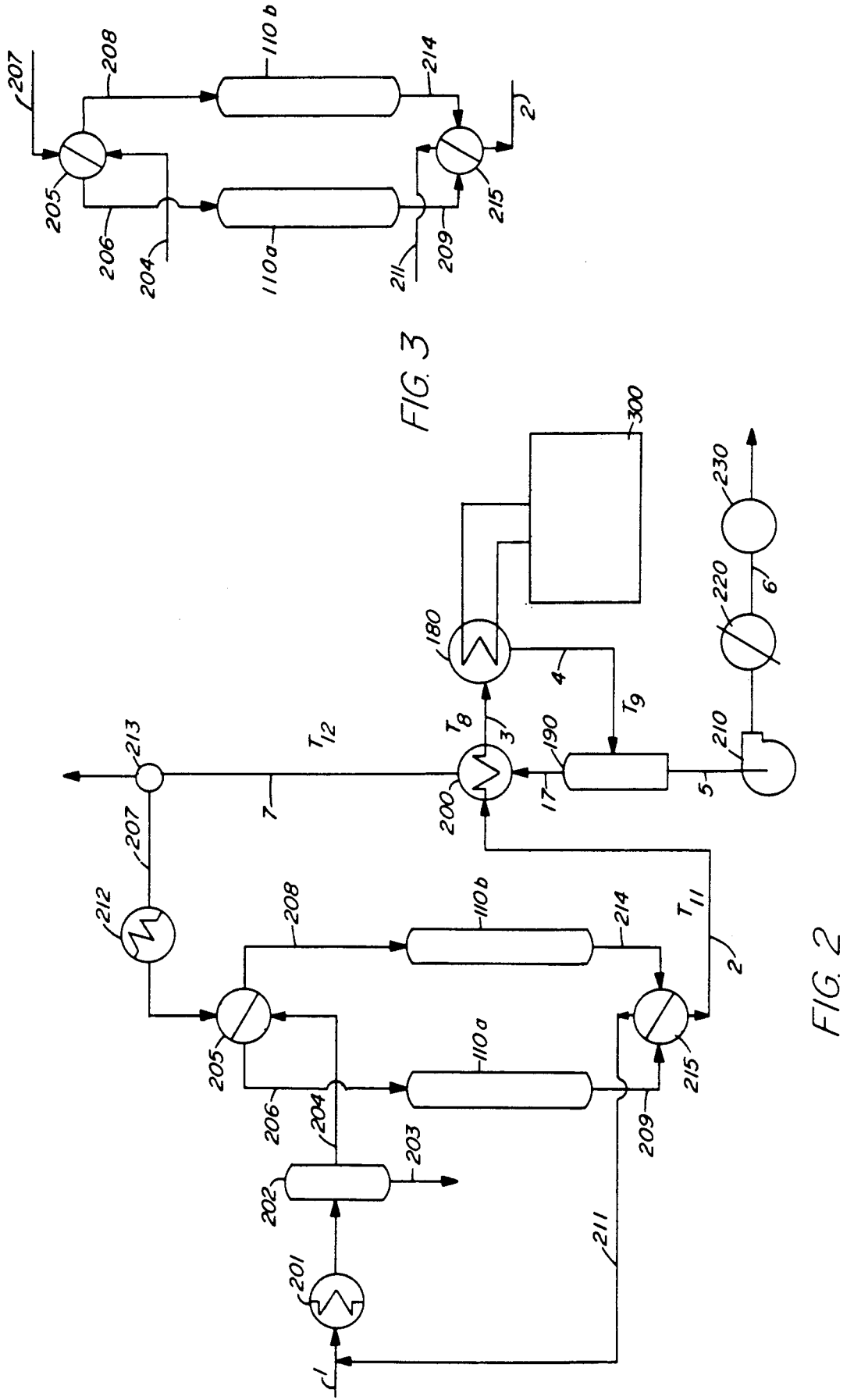

VAPOR RECOVERY SYSTEM

BACKGROUND OF THE INVENTION

1. Field of the invention

The present invention relates to improved closed cycle refrigeration systems, particularly for removing excessive hydrocarbons or other chemicals from air-vapor mixtures by condensation.

2. Related information

Environmental concerns have led to a requirement for the reduction of chemical vapors, particularly hydrocarbons emitted into the atmosphere from every possible source. One of the sources targeted are bulk loading and unloading terminals. In these terminals a vapor recovery system is used to gather the air containing hydrocarbons or other vapors which are emitted during loading and unloading operations. The vapors are commonly separated from the air by refrigeration of the air-vapor mixture to cryogenic temperatures. The refrigeration systems can reduce "condensable" hydrocarbons or other condensable materials in the vented air to acceptable levels, i.e., less than 80 mg/l.

The cryogenic temperatures required, i.e., about $-100°$ F., necessitate efficient refrigeration to achieve the separation. Since the total amount of refrigeration, expressed in tons (1 ton = 12,000 BTU removed), is small when compared to large scale plants, such as ice plants and gas liquefaction plants, less efficient closed refrigeration cycles can be used with the common fluorocarbon refrigerants such as Freon 12.

With less efficient refrigerants, greater circulation and more compression power is required. Cascade refrigeration, using two refrigerants—one to cool the other—is an alternative. The most commonly used closed refrigeration cycle in these smaller scale plants is the compression of the refrigerant followed by cooling at the higher pressure and expansion across a Joules-Thomson expansion valve, the cycle being used to cool both refrigerants in the cascade refrigeration system. However, with the advent of concerns about damage to the atmosphere attributed to the fluorocarbons, these are being banned or expected to be banned in commercial operations.

A turboexpander may be used when the refrigerant is at a "free" higher pressure. As disclosed in commonly owned co-pending application Ser. No. 07/354,860 filed May 22, 1989, now U.S. Pat No. 4,923,492, the disclosure of which is fully incorporated by reference herein. Included in that disclosure are two desiccant type dryers operated in parallel to remove water from the vapors which would otherwise freeze at the cryogenic temperatures utilized. The desiccant type dryers must be periodically regenerated because their capacity is limited by the volume and adsorbing capacity of the desiccant used.

SUMMARY OF THE INVENTION

Briefly the invention comprises dehydrating then cooling organic chemical vapors in a chiller at cryogenic temperatures to condense and remove condensable chemicals and thereafter using the chilled air vented from the chiller to pre-cool the vapor entering the chiller, thereby converting some of the energy used to produce the cryogenic temperature. If desired, the warmed dry air from the pre-cooling may then be used to regenerate the desiccant within the dehydration system. The air may be heated before use as regeneration gas.

BRIEF DESCRIPTION OF THE DRAWING

FIG. 2 depicts an alternate embodiment of the present invention having additional features.

FIG. 3 shows the adsorber component of FIG. 2 in an alternative valving configuration.

DETAILED DESCRIPTION OF THE PREFERRED EMBODIMENT

Figure 1:
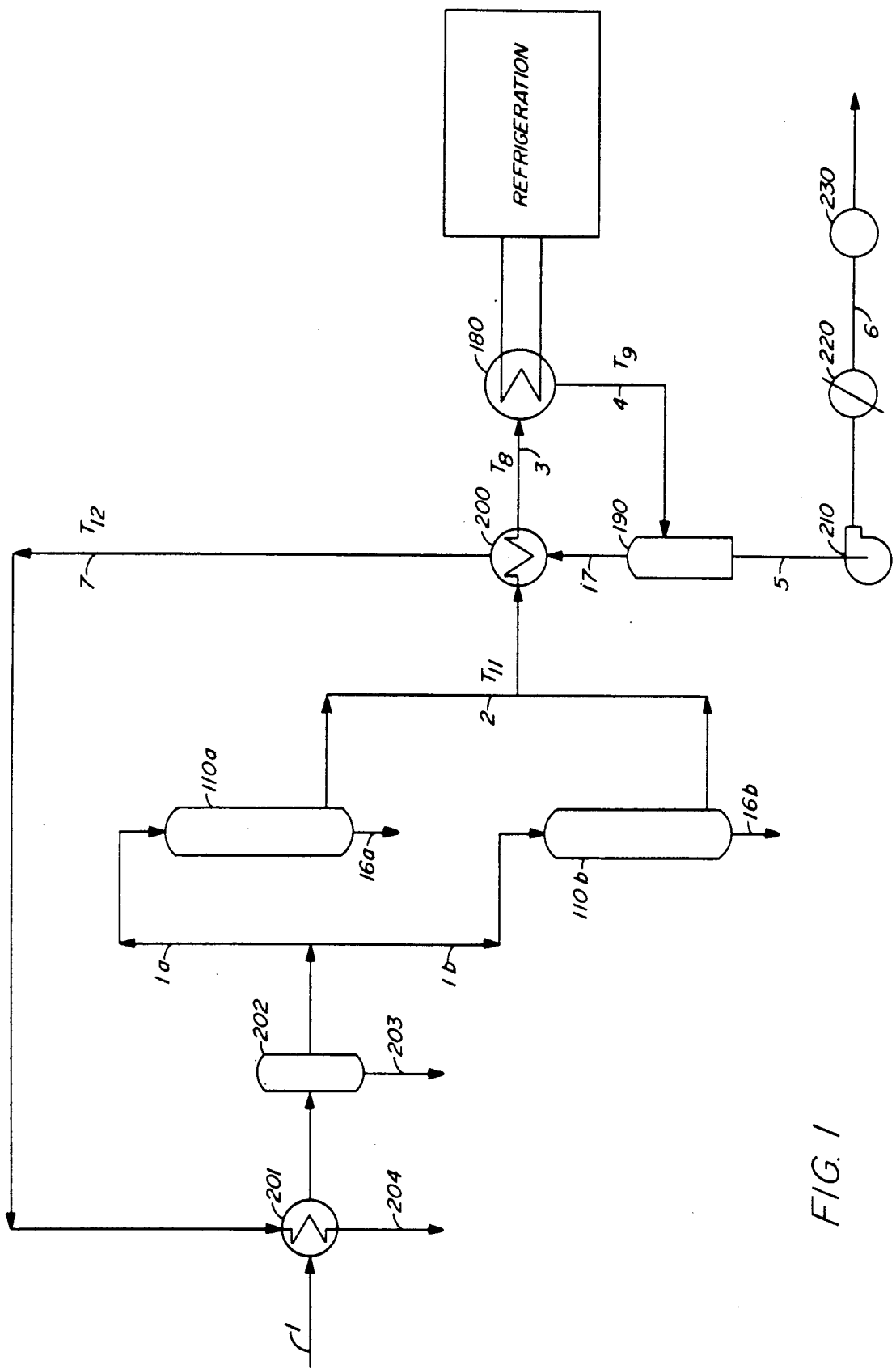
FIG. 1 depicts a schematic flow diagram of the present invention as used in vapor removal from air.

In one embodiment of the present invention ethane is used as the refrigerant in a closed loop compression, turboexpander cycle to cool air containing hydrocarbons and condense the hydrocarbons for removal as disclosed in co-pending application Ser. No. 07/354,860 which has been incorporated herein. FIG.1 depicts a diagram of this application with no detail of the refrigeration cycle, which in any instance may be conventional.

The air-hydrocarbon mixture containing water (usually saturated) is collected in header 1 and is first passed through heat exchanger 201 where it is cooled from ambient temperature to about 35° F. by indirect heat exchange. The cooled air-hydrocarbon mixture is then passed to knock out pot 202 where condensed water is removed via flow line 203. The air-hydrocarbon mixture, less some of the water, is then passed by flow lines 1a or 1b to one of two dehydrators 110a or 110b to remove the remaining water from the vapor. The water must be removed to prevent freezing and plugging of the lines at the temperatures used in the chiller 180. The dehydrator vessels 110a or 110b contain a common gas desiccant which readily adsorbs water in preference to hydrocarbons such as a molecular sieve. The vessels are arranged for parallel flow so that the sieve in one may be regenerated while the other is in service. The common valving for such arrangement has not been shown in this embodiment but is well known in the art. The desiccant is regenerated by passing warm dry gas through the desiccant to desorb the water therefrom. There can be just one dehydrator, which is regenerated by shutting down the unit.

The now dry vapor mixture at substantially atmospheric pressure and 35° F. is next passed to a precooler 200 via flow line 2 where it is cooled to a temperature $T_8$ of about 0° F. by indirect heat exchange with the cold vented air (returning via line 4, separator 190 and line 17 after contact in chiller 180). The vapor mixture is then chilled to a temperature $T_9$ of about $-130°$ F. in vapor chiller 180 wherein about 90+ per cent of the condensable hydrocarbons are liquified by indirect heat exchange with the cold refrigerant gas from the refrigerant section 300. The liquid hydrocarbons, containing essentially no water, are recovered in separator 190 and sent to storage through flow line 5 by pump 210. Check valve 220 in flow line 6 prevents backflow of vapors and vapor lock of pump 210. Meter 230 is provided to monitor the flow rate of recovered vapors.

The air effluent from the separator 190 is passed via line 17 first to vapor precooler 200 to absorb additional heat from the vapor mixture by indirect heat exchange therewith. The air may then be vented to the atmosphere via line 7 containing less than about 35 mg/l of condensable hydrocarbons which is well within current EPA limits.

Referring now to FIG. 2 there is shown an alternate embodiment of the present invention.

In this embodiment the hydrocarbon laden vapor passes from the knock out pot 202 via line 204 to four way valve 205 where it is directed to adsorber 110a in this configuration via line 206 where the remaining water vapor is removed by mole sieve. The dry vapor exits via line 209 to four way valve 210 from whence it is directed, in the configuration depicted, to pre-cooler 200 via line 2 hence into the chiller 180 via line 3.

The dry vapors substantially free of hydrocarbons exit the hydrocarbon removal area via line 7 and may be vented through valve 213 or sent via 207 to four way valve 205. In the configuration shown there vapors are directed via line 208 to adsorber 110b which for this illustration is assumed to contain mole sieve used to adsorb water in a prior cycle. The dry vapors regenerate the desiccant in adsorber 110b by stripping and desorbing the water from the desiccant, thereby again becoming wet in the manner of the feed from header 1.

The water laden vapors exit adsorber 110b via 214 and pass through four way valve 210 to enter the feed in header 1 via 211.

It is preferable that the dry clean vapor from the chiller be heated prior to being used as a water desorber gas and a heater 212 is shown for that purpose.

FIG. 3 shows the adsorber section of FIG. 2 with the four way valves 205 and 210 in the reversed position, such that wet, hydrocarbon containing vapor is directed to adsorber 110b (via 208) for drying. The dry clean vapor is directed via 106 to adsorber 110a to regenerate the mole sieve. Similarly feeds from each adsorber are reversed from that described in FIG. 2.

When the regeneration gas is returned to collection header 1, the water removed from the adsorber unit is for the most part removed in the knock out pot, thus the water is not merely being recycled in the system as it might appear. The build up of air in the system may be handled by periodic purging via vent line 7 or the use of a continuous bleed stream.

Although the process and apparatus has been described in regard to a water/hydrocarbon vapor stream, the procedure will work for any condensable organic compound entrained in the vapor. In fact if the present system is used at a gasoline truck depot to recover vapors encountered during loading, there may be a variety of organic compounds other than hydrocarbons in the vapor, e.g., methyl tertiary butyl ether (octane improver) methanol, and ethanol (gasoline expanders) Tertiary butyl alcohol (octane improver) methyl tertiary amyl ether (octane improver) and ethyl tertiary amyl ether (octane improver).

Desiccant as well as the temperatures may have to be adjusted for different organic compounds although the process will remain basically as described.

The temperatures and pressures are given for a particular system as an exemplification and for illustration purposes and are not intended to limit the scope of the invention which is defined by the appended claims.

The invention claimed is:

1. A system for removing substantially all of the organic compound vapors from an air-organic compound vapor mixture, comprising:
   (a) a collection header for collecting said mixture;
   (b) a first heat exchanger in fluid communication with said header to effect indirect heat exchange between the mixture entering and a refrigerant and thereby cool said entering mixture to condense a portion of the water contained therein;
   (c) a knock out pot in fluid communication with said first heat exchanger to collect and remove said portion of water condensed;
   (d) at least one desiccant vessel in fluid communication with said knock out pot to receive the vapor therefrom and for removing any water remaining within said mixture;
   (e) a second heat exchanger in fluid communication with said dehydration means;
   (f) a vapor chiller in fluid connection with said second dehydration to condense substantially all of said organic compounds in said mixture by indirect heat exchange with a refrigerant gas at a cryogenic temperature;
   (g) a separator in fluid communication with said chiller to separate said condensed organic compounds from said mixture;
   (h) a flow line connecting said separator to carry the uncondensed vapors from said separator to said second heat exchanger to effect indirect heat exchange between said uncondensed vapors and the dehydrate mixture prior to entering said chiller;
   (i) a means to remove substantially all of said condensed organic compounds from said vapor chiller; and
   (j) a vent to remove said vapor less substantially all of said hydrocarbons from said second heat exchanger.

2. The system of claim 1 wherein said vent is switchably connected to said desiccant vessel such that said vapors may be used to regenerate said desiccant when desired.

3. The system of claim 1 wherein there are at least two desiccant vessels manifolded together for parallel operation, one of said vessels being in operation while the desiccant in the other is being regenerated.

4. The system of claim 2 wherein said vent is manifolded to said vessels such that said vapor less substantially all of said hydrocarbons ay be used to regenerate said desiccant when desired.

5. The system of claim 3 additionally comprising a separator in fluid communication with said chiller to separate said condensed organic compounds from said mixture.

6. The system according to claim 5 wherein said vent is manifolded to said vessels such that said vapor less substantially all of said organic compounds may be used to regenerate said desiccant when desired.

7. The system according to claim 1 wherein the organic compound comprises a condensable hydrocarbon.

8. The system according to claim 6 wherein the organic compound comprises a condensable hydrocarbon.

9. The system of claim 4 wherein said vapor used to regenerate said desiccant is returned to said collection header after said regeneration.

10. The system of claim 6 wherein said vapor used to regenerate said desiccant is returned to said collection header after said regeneration.

11. A process for removing condensable organic compounds from an air-organic compound mixture containing water to provide a clean vapor substantially free of said hydrocarbons or chemicals, comprising:
   (a) collecting said mixture in a header;

(b) indirectly heat exchanging said mixture to cool said mixture such that a portion of the water contained in said mixture is condensed;

(c) removing said portion of condensed water from said mixture;

(d) contacting said mixture with a desiccant in a dehydration zone to remove the remainder of said water;

(e) indirectly heat exchanging said dehydrated mixture and a cooled, clean, dry vapor from step (h).

(f) indirectly heat exchanging said dehydrated mixture with a refrigerant at cryogenic temperatures to condense substantially all of said organic compounds contained in said mixture; and (g) separating said condensed organic compounds from said dehydrated mixture to provide a cooled clean, dry vapor substantially free of said organic compounds.

12. The process according to claim 11 comprising terminating the contact of said mixture with said desiccant and contacting said clean dry vapor with said desiccant in said dehydration zone to remove water therefrom.

13. The process according to claim 11 additionally comprising passing a portion of said clean vapor to a second dehydration zone containing a desiccant with water adsorbed thereon to desorb said water and regenerate said desiccant.

* * * * *